United States Patent [19]

Hanagata

[11] Patent Number: 4,709,249

[45] Date of Patent: Nov. 24, 1987

[54] INK JET RECORDER HAVING INK CONTAINER VENT BLOCKING MEANS

[75] Inventor: Takayoshi Hanagata, Yamato, Japan

[73] Assignee: Canon Kabushiki Kaisha, Tokyo, Japan

[21] Appl. No.: 742,799

[22] Filed: Jun. 10, 1985

[30] Foreign Application Priority Data

Jun. 21, 1984 [JP] Japan ................................ 59-128247
Jun. 21, 1984 [JP] Japan ................................ 59-128249

[51] Int. Cl.⁴ ............................................ G01D 15/16
[52] U.S. Cl. ............................................ 346/140 R
[58] Field of Search .................................. 346/140, 75

[56] References Cited

U.S. PATENT DOCUMENTS 4,376,283 3/1983 Bower ................................ 346/140
4,383,263 5/1983 Ozawa ................................ 346/140
4,419,677 12/1983 Kasugayama ........................ 346/140
4,589,000 5/1986 Koto ................................... 346/140

*Primary Examiner*—Joseph W. Hartary
*Attorney, Agent, or Firm*—Fitzpatrick, Cella, Harper & Scinto

[57] ABSTRACT

An ink jet recorder having an ink container and a recording head, to which ink in the ink container is supplied, is mounted on a carriage moving along a recording plane of a recording medium from a stand-by position to a print position. The recording head is driven in accordance with a recording signal to discharge ink toward the recording medium. A vent path is formed in the ink container to communicate with atmosphere, and a vent blocking device for blocking the vent path from the atmosphere is provided on the recorder body, wherein the vent path is blocked from atmosphere when the recording head is in the stand-by position.

1 Claim, 5 Drawing Figures

INK JET RECORDER HAVING INK CONTAINER VENT BLOCKING MEANS

BACKGROUND OF THE INVENTION

1. Field of the Invention

The present invention relates to a construction of an ink jet recorder, and more particularly to a construction of an ink jet recorder which mounts a recording head as well as an ink container on a carriage moving along a record medium.

2. Description of the Prior Art

The ink jet recorder as well as a wire dot recorder and a thermal recorder have been used as output devices of electronic equipments such as printers or facsimile machines. The ink jet recorder is noiseless and suitable for high speed printing and easily prints a color image. Accordingly, it has been used as a high performance recorder.

In the ink jet recorder, ink in an ink container is supplied to a recording heads and a drive element for discharging the ink on the recording head is driven in accordance with a record signal such as a print pattern so that ink droplets are discharged toward a record medium (paper).

In order to reduce weight of the recorder and simplify the construction, the ink container is mounted on a carriage.

When the ink is continuously supplied to the recording head during the record operation, a vacuum is created in the ink container and supply of the ink to the recording head is not sufficient or is unstable and print quality may be degraded. Accordingly, it is required to provide vacuum prevention means for maintaining a constant pressure (e.g. atmospheric pressure) in a space on the ink level in the ink container.

If a vent port is provided in the ink container as the vacuum prevention means, the ink solvent vaporizes during a long stand-by period and an ink viscosity increases, or foreign materials such as dusts are introduced into the ink container. As a result, the print quality is degraded when the print operation is resumed.

SUMMARY OF THE INVENTION

It is an object of the present invention to provide an ink jet recorder having an ink container mounted on a carriage, which resolves the problems encountered in the prior art recorder.

It is another object of the present invention to provide an ink jet recorder which enables smooth supply of ink during a print operation and prevents increase of a viscosity of the ink and introduction of foreign materials during stand-by mode so that a print quality is improved.

It is another object of the present invention to provide an ink jet recorder which prevents vacuum in the ink container during the print operation to improve the print quality and maintains a pressure in the ink container within a predetermined range during the stand-by mode even if the surrounding temperature rises to prevent ink droplet from dropping from a discharge port of the recording head.

It is another object of the present invention to provide an ink jet recorder in which an ink container and a recording head into which ink in the ink container is supplied are mounted on a carriage moving along a record plane of a record medium and the recording head is driven in accordance with a record signal to discharge the ink toward the record medium, and a vent communicating with atmosphere is formed in the ink container and the vent is blocked from the atmosphere by a variable volume air chamber when the carriage is in a rest position.

DETAILED DESCRIPTION OF THE PREFERRED EMBODIMENTS

One embodiment of a color ink jet recorder of the present invention is explained with reference to FIGS. 1 to 4.

Figure 1:
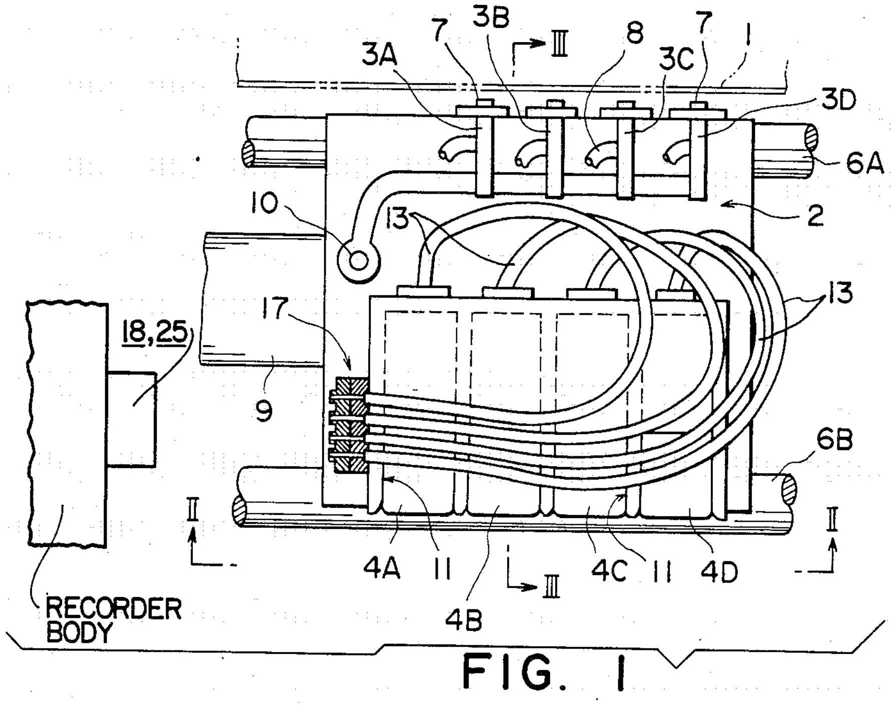
FIG. 1 is a plan view, partly cut away and viewed from a line I—I shown in FIG. 3, of a main portion of one embodiment of an ink jet recorder of the present invention.
Figure 2:
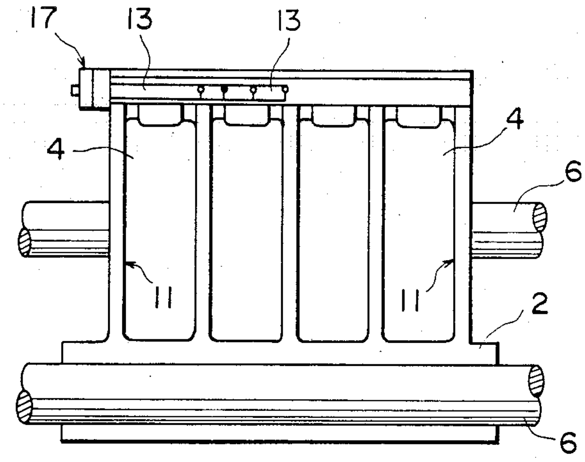
FIG. 2 is a rear view as viewed from a line II—II shown in FIG. 1.
Figure 3:
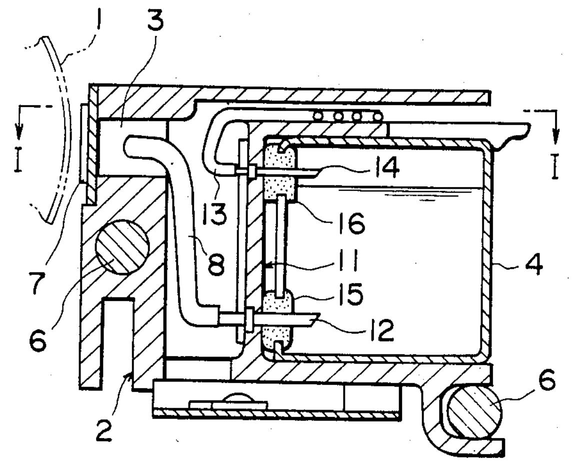
FIG. 3 is a longitudinal sectional view as viewed from a line III—III shown in FIG. 1, and FIGS. 4 and 5 are developed perspective views of vent blocking means.

In FIGS. 1 to 3, four recording heads 3A, 3B, 3C and 3D and four ink containers (ink cartridges) 4A, 4B, 4C and 4D for supplying inks to the respective recording heads are mounted on a carriage 2 which moves along a record medium (sheet) 1.

The record medium 1 is backed up by a platen (not shown) and fed thereby and the carriage 2 is moved along a pair of guide shafts 6A and 6B extending in parallel to the platen.

The four recording heads 3A to 3D discharge inks of different colors from each other. Black and three primary color (cyan, magenta and yellow) inks are filled in the corresponding ink containers.

Each of the recording heads 3A to 3D has a chip 7 having a plurality of (e.g. 24) orifices and a plurality of drive elements for discharging the ink. The drive elements of the head chip are driven in accordance with a print pattern signal to discharge inks from selected orifices.

An ink supply tube 8 is connected between each of the ink containers 4A to 4D and each of the recording heads 3A to 3D. The head chip 7 is driven by currents supplied to the recording heads through a flexible circuit 9 and a common electrode 10. The drive system may be a piezoelectric system or a heating system in which bubbles are generated in the ink.

The ink containers 4A–4D are exchangeably accommodated in four recesses 11 formed in the carriage 2.

As shown in FIG. 3, an ink supply hollow needle 12 having the ink supply tube 8 connected thereto is fixed at a bottom on an inner surface of each of the recesses 11, and a vent hollow needle 14 having a vent tube 13 communicating with atmosphere connected thereto is fixed at a top of the recess 11.

The hollow needles 12 and 14, when the ink containers 4A–4D are mounted, extend through receptacles 15 and 16 of the ink containers 4A–4D to form ink take-out ports and vent ports on the ink surfaces.

The other end of the vent tube 13 is connected to a tube end block 17 of the carriage 2 and opens to the atmosphere on an outer surface of the tube end block 17.

The carriage 2 is moved left and right along the guide shafts 6A and 6B and characters are printed while the carriage moves from left to right, then the carriage is returned to the left end and next characters are printed, or characters may be printed during both left-to-right and right-to-left movements of the carriage. The carriage is positioned at the left end in a rest position. That is, the left end is a home or stand-by position.

Figure 4:
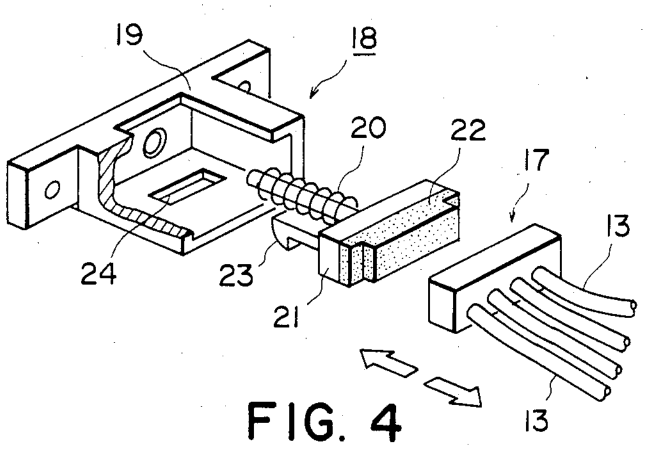

Vent blocking means 18 as shown in FIG. 4 is provided near the home position of the recorder. When the carriage 2 is at the home position, the vent blocking means 18 abuts against the outer side of the tube end block 17 to block the vent paths 13 of the ink containers 4A to 4D from the atmosphere.

The vent blocking means 18 comprises a bracket 19 fixed to the recorder, a base member 21 mounted on the bracket 19 and biased fowardly of the carriage movement by a spring 20 and a resilient pad 22 such as rubber fixed on the front surface of the base member 21. In the illustrated example, a pawl 23 formed in the base member 21 is engaged with an opening 24 formed in the bracket 19 to latch the base member 21.

When the carriage 2 reaches the home position, the pad 22 is pressed to the outer side of the tube end block 17 to block the vent paths 13 from the atmosphere. In this manner, the vent paths 13 are automatically blocked from the atmosphere in a linked relation with the movement of the carriage 2.

In the present embodiment, the inside of the ink containers 4A–4D are communicated with the atmosphere through the vent paths 13 during the record operation so that the generation of vacuum due to the supply of the ink is prevented and the sufficient ink is supplied to assure the high print quality.

During the stand-by period, the vent paths 13 are closed. Accordingly, even if the stand-by period is long, the increase of the ink viscosity due to the evaporation of the ink solvent is prevented and the introduction of foreign materials such as dust into the ink containers 4A–4D is prevented. Thus, the print quality when the print operation is resumed is maintained at a high level.

In the present embodiment, the vent blocking means 18 is actuated at the specified position (home position) within the range of movement of the carriage 2 in the linked relation with the movement of the carriage 2. Alternatively, it may be actuated mechanically or electrically.

For example, a solenoid valve may be provided in the vent path 13 so that the vent path 13 may be opened or closed by an electromechanical transducer device. In this case, the vent path 13 may be blocked either at the specified position of the carriage or at any position.

In the ink jet recorder, the ink solvent vaporizes from the orifices of the head chip during the stand-by period so that the viscosity of the ink around the orifices increases, or dust particles may be introduced and the print quality at the time when the print operation is resumed is degraded. In order to prevent it, a recovery operation may be performed prior to the resumption of the record operation.

In the recovery operation, the ink is dummy-discharged in the same direction as that in the record operation. To this end, the ink around the recording head 3 is pressurized in the discharge direction or the ink around the orifices is sucked by a pump. The recovery operation is usually performed by a recovery device arranged at the home position.

In order to assure quick and proper dummy discharge of the ink from the orifices, it is desired to communicate the insides of the ink containers 4A to 4D to the atmosphere.

Accordingly, in another embodiment of the present invention, the ink is discharged from the orifices of the recording head 3 and the blocking of the vent paths 13 from the atmosphere is released in linked relation with the recovery operation. When the vent paths 13 and the vent blocking means 18 are used, the block may be released by retracting the base member 21 by solenoid means to move the pad 22 away from the block 17. Alternatively, a solenoid valve provided in the vent path 13 may be opened or closed.

In the present embodiment, four ink containers 4A–4D are used although any number of ink containers may be used. The present invention is applicable when only one ink container is used or any number of ink containers are used.

Figure 5:
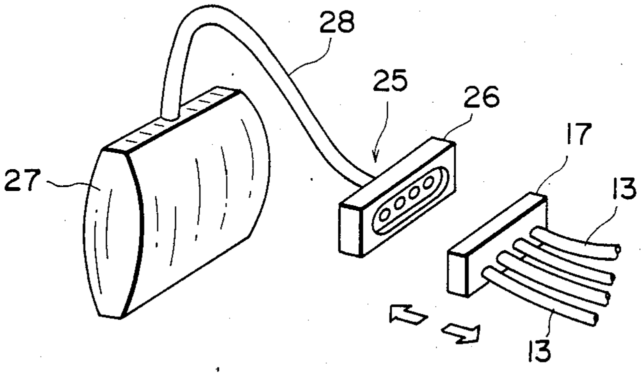

FIG. 5 shows a further embodiment of the vent blocking means of the present invention.

The vent blocking means 25 shown in FIG. 5 comprises a pad member 26 which is arranged at a position in which it is press-contacted to the outer side of the tube end block 17 when the carriage 2 reaches the home position and which has a path communicating with the vent path opening of the tube end block 17, a bag 27 for forming a variable volume air chamber, and a connecting tube 28 for connecting the path of the pad member 26 with the inside of the bag 27.

When the carriage 2 is in the stand-by position, the vent paths 13 of the ink containers 4A to 4D are blocked from the atmosphere through the variable volume air chamber 27.

In the present embodiment, since the insides of the ink containers 4A to 4D are kept at a constant pressure through the vent paths 13 during the print operation, the instability and the shortage of the ink supply are prevented and the high print quality is maintained.

In the stand-by period, the vent paths 13 are closed. Accordingly, even if the stand-by period is long, the increase of the ink viscosity due to the evaporation of the ink solvent is prevented and the high print quality at the time of resumption of the print operation is assured.

Since the vent paths 13 are blocked from the atmosphere through the variable volume air chamber 27, even if the pressures in the ink containers 4A–4D change by the change in the surrounding temperature, the pressure changes can be absorbed by the expansion or shrinkage of the air chamber 27. Accordingly, the ink containers 4A–4D can be always maintained at a constant pressure and the drop of the ink from the orifices of the head chip 7 due to the increase of the pressure by the rise of the surrounding temperature is prevented.

What I claim is:

1. An ink jet recorder comprising:

an ink container having a vent path;

a recording head mounted on a carriage that is moveable relative to a recording medium between a stand-by position and a recording position, wherein said ink container is arranged for supplying ink to said recording head and said recording head is adapted to be responsive to a recording signal for discharging the ink toward the recording medium; and vent blocking means having a variable volume air chamber for blocking said vent path from communication with the atmosphere when the carriage is in the stand-by position.

* * * * *